Feb. 3, 1931. E. PERKS 1,791,000
PROCESS FOR THE MANUFACTURE OF BUTTER
Filed Nov. 1, 1928
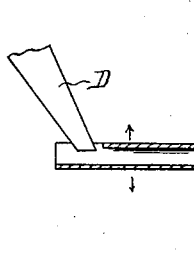
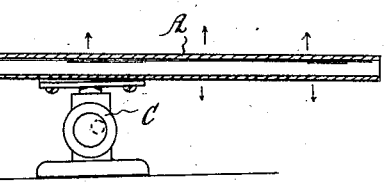
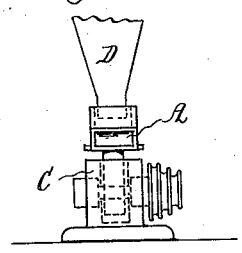
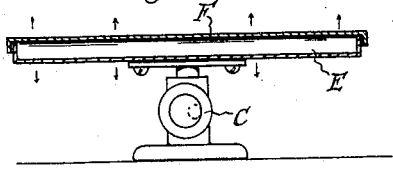

Patented Feb. 3, 1931

1,791,000

UNITED STATES PATENT OFFICE

EDGAR PERKS, OF AUCKLAND, NEW ZEALAND

PROCESS FOR THE MANUFACTURE OF BUTTER

Application filed November 1, 1928, Serial No. 316,427, and in New Zealand April 5, 1928.

This invention has reference to the manufacture of butter from cream and it has been designed with the object of providing a new process or method whereby the cream may be converted into butter at a much more rapid rate than is possible with the churning process now mostly employed, and in which the cream may be treated at a higher temperature than is usual with the churning process.

This new process is of such a nature as to allow for the butter making being carried on as a continuous process under which the cream is caused to flow in a controlled stream through the apparatus employed and in its passage is converted into butter, or it will also allow of a layer of cream being acted upon to convert it into butter.

The invention also covers apparatus that may be used for carrying out such process.

The process of manufacture, according to this invention, consists in subjecting the cream (which requires to be in a free liquid condition) while extending over a surface in a thin, or comparatively thin, layer, to an action whereby it is subjected to a repeated impact obtained by a vibratory motion imparted thereto. This motion is of suitable amplitude and frequency to ensure of an effective impact of the fat globules in the cream, upon each other and with the surface over which the cream extends, so that they are consolidated and agglomerate to form the butter.

The process may be more effectively carried out by the employment of a second surface, in parallel with that over which the cream extends, and disposed to permit of the free movement of the cream between the two so that the cream is also thrown against such second surface.

The said vibratory motion may be directed to the cream as it is caused to flow through a conduit of approved cross sectional shape, and to which conduit vibratory mechanism conveys reciprocatory movements in a plane perpendicular to the surface on which the cream rests. The cream therefore may be fed into one end of this conduit in a continuous stream and will in its passage therethrough, be converted into butter, to pass away as such from its other end. By arranging the conduit at approved degrees of inclination, the period of time in making the passage may be regulated.

Or, if so desired, the process may be carried out upon a layer of cream placed in a closed shallow vessel to which the vibrations are imparted, the depth of cream being properly proportioned to the height of the vessel.

Apparatus suitable for carrying out this process, is illustrated in the accompanying drawings, in which:—

Figure 1 is a longitudinal section of apparatus designed for a continuous process.

Figure 2 is an end elevation thereof.

Figure 3 is a sectional elevation of apparatus designed for dealing with a layer of cream.

In Figures 1 and 2, A represents a conduit or pipe of rectangular cross section, that is of approved width, height and length, according to the quantity of cream to be dealt with. This conduit may be disposed at an incline from one end to the other to provide for the flow of cream along the conduit bottom at the rate requisite to cause it to pass through the conduit in a specific period of time. The conduit is mounted on the top of a vibrator apparatus C, of any approved construction, designed to impart up and down reciprocations to the conduit, through regulatable amplitudes. The cream is fed into the upper end of the conduit through a feed spout D and the product delivered from its lower end may be caught in any desired receptacle.

In the form shown in Figure 3, the apparatus consists of a shallow pan E that is fixed to the vibrator apparatus C, and is provided with a cover F for enclosing the space within it.

In each instance the reciprocatory movements of the cream containing vessel or chamber causes the cream, when controlled or governed in its quantity to form a relatively thin layer upon the vessel bottom, to be thrown violently upwards and downwards between the surfaces within which it is confined, and thus to receive the impact requisite for its conversion into butter. As before-mentioned, it is desirable in order that the cream may thus be freely moved, that it should be in a free running liquid condition, by the addition, for example, of a quantity of water. If water is used, such water may be salted in order to salt the butter product to the necessary extent required in its manufacture according to the usual methods.

The product of the vibratory treatment is subsequently worked up by the usual methods to form the butter of commerce.

The period taken in the conversion of the cream into butter is determined by the nature of the cream and its temperature, with respect to the force of impact with which it is caused to engage the surface or surfaces with which it is concerned. Such force in turn is determined by the frequency and amplitude of the vibrations (and with a covered container) with the amount of movement of the cream allowed for therein.

It has been found that good results may be obtained by the employment of a container having a depth of three quarters of an inch, with cream at a temperature of 60 degrees Fahrenheit, and one quarter of an inch deep, and the submission of such container to vibrations of a frequency of 1250 per minute and through an amplitude of one inch. Such treatment resulted in the production of butter in a period of ten seconds of time. In another instance with the same depth of container and with the same depth of cream at approximately the same temperature, and with a vibration of 1050 per minute frequency and an amplitude of five sixteenths of an inch, butter was formed in four minutes.

As a still further example, with cream at a temperature of 86 degrees Fahrenheit, and a depth of one quarter of an inch in a container of three quarters of an inch, and vibrations of 1250 per minute through an amplitude of one inch, butter was formed in 40 seconds, the butter being delivered in a semi-liquid condition. Under the same conditions with cream at a temperature of 104 degrees Fahrenheit the butter was formed in sixty seconds, the butter fat in a liquid state having completely separated from the butter milk.

I claim:—

1. A process for the manufacture of butter consisting in subjecting a stream of cream to repeated impact through vibratory motion imparted thereto in a direction perpendicular to its surface.

2. A process for the manufacture of butter from cream, in which the cream, in a thin layer, is placed upon the bottom of a shallow closed vessel and such vessel is subjected to a vibratory action in a direction perpendicular to the surface of the said layer of cream.

3. A process for the manufacture of butter from cream, in which the cream in a thin layer is caused to flow along upon the bottom of a closed shallow vessel and in which such vessel is subjected to a vibratory action in a direction perpendicular to the surface of the said layer of cream.

4. A process for the manufacture of butter from cream, in which the cream, in a thin layer, is placed upon the bottom of a shallow closed vessel and such vessel is subjected to vibratory action of controlled amplitude and frequency in a direction perpendicular to the surface of the said layer of cream.

In testimony whereof, I affix my signature.

EDGAR PERKS.